US012729135B2

(12) United States Patent
Park et al.

(10) Patent No.: US 12,729,135 B2
(45) Date of Patent: Sep. 8, 2026

(54) POSITIVE ELECTRODE ACTIVE MATERIAL FOR LITHIUM SECONDARY BATTERY AND METHOD OF PREPARING THE SAME

(71) Applicant: LG Energy Solution, Ltd., Seoul (KR)

(72) Inventors: Sang Min Park, Daejeon (KR); Eun Sol Lho, Daejeon (KR); Sung Bin Park, Daejeon (KR); Seul Ki Kim, Daejeon (KR); Wen Xiu Wang, Daejeon (KR); Joong Yeop Do, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1032 days.

(21) Appl. No.: 17/788,814

(22) PCT Filed: Jan. 29, 2021

(86) PCT No.: PCT/KR2021/001219
§ 371 (c)(1),
(2) Date: Jun. 24, 2022

(87) PCT Pub. No.: WO2021/154035
PCT Pub. Date: Aug. 5, 2021

(65) Prior Publication Data

US 2023/0034497 A1 Feb. 2, 2023

(30) Foreign Application Priority Data

Jan. 30, 2020 (KR) ........................ 10-2020-0011339

(51) Int. Cl.
*H01M 4/525* (2010.01)
*H01M 4/02* (2006.01)
*H01M 4/04* (2006.01)
*H01M 4/485* (2010.01)
*H01M 4/505* (2010.01)
*H01M 10/052* (2010.01)

(52) U.S. Cl.
CPC ......... *H01M 4/525* (2013.01); *H01M 4/0471* (2013.01); *H01M 4/485* (2013.01); *H01M 4/505* (2013.01); *H01M 10/052* (2013.01); *H01M 2004/021* (2013.01); *H01M 2004/028* (2013.01)

(58) Field of Classification Search
CPC ..................................................... H01M 4/525
See application file for complete search history.

(56) References Cited

U.S. PATENT DOCUMENTS

2013/0004849 A1 1/2013 Satoh
2015/0014605 A1 1/2015 Kawakami et al.
2016/0028074 A1 1/2016 Sugiura
2016/0099469 A1 4/2016 Paulsen et al.
2016/0164089 A1 6/2016 Kawakami et al.
2016/0204423 A1 7/2016 Jeong et al.
2017/0179470 A1 6/2017 Choi et al.
2018/0175368 A1 6/2018 Zhou et al.
2018/0316009 A1 11/2018 Park et al.
2019/0221838 A1 7/2019 Ishikawa et al.
2019/0296349 A1 9/2019 Cho et al.
2019/0341599 A1 11/2019 Lee et al.
2020/0020943 A1* 1/2020 Natsui .................... C01G 51/50
2020/0161633 A1 5/2020 Zhou et al.
2020/0280065 A1 9/2020 Jang et al.
2020/0295367 A1 9/2020 Yoo et al.
2020/0373573 A1 11/2020 Kim et al.
2021/0005875 A1 1/2021 Lee et al.
2021/0020902 A1 1/2021 Yoo et al.
2021/0083274 A1 3/2021 Ishikawa et al.
2021/0143421 A1 5/2021 Mitsumoto

FOREIGN PATENT DOCUMENTS

CN 102754254 A 10/2012
CN 108807864 A 11/2018
JP 2002231243 A 8/2002
JP 2019125575 A 7/2019
JP 2019172572 A 10/2019
KR 20150027003 A 3/2015

(Continued)

OTHER PUBLICATIONS

International Search Report for PCT/KR2021/001219 dated May 11, 2021. 3 pgs.

Belharouak, I. et al., "Safety characteristics of Li(Ni0.8Co0.1 5Al0.05)02 and Li(Ni 113Co u3Mn u3)02" Electrochemistry Communications Elsevier Amsterdam, Feb. 2006, pp. 329-335, vol. 8, Issue 2.

Joo Noh, H. et al., "Comparison of Nanorod-Structured Li[Ni0. 54C00.16Mn0.30]02 with Conventional Cathode Materials for Li-Ion Batteries" ChemSusChem, Oct. 2013, pp. 245-252, vol. 7, Issue 1.

Extended European Search Report including Written Opinion for Application No. 21747147.3 dated Apr. 20, 23, pp. 1-8.

*Primary Examiner* — Stephan J Essex
(74) *Attorney, Agent, or Firm* — Lerner David LLP

(57) ABSTRACT

A positive electrode active material, method of making the same, and positive electrode and lithium secondary battery include the same are disclosed herein. In some embodiments, a positive electrode active material in a form of single particles, includes a lithium transition metal oxide having nickel (Ni) in an amount greater than 50 mol % based on a total number of moles of transition metals excluding lithium, wherein a single particle has a region of 50 nm or less from a surface of the single particle along a center direction, and wherein a structure belonging to space group FD3-M and a structure belonging to space group Fm3m are formed in the region, and wherein a generation rate of fine powder having an average particle diameter ($D_{50}$) of 1 μm or less is in a range of 5% to 30% when the positive electrode active material is rolled at 650 kgf/cm$^2$.

11 Claims, No Drawings

(56) References Cited

FOREIGN PATENT DOCUMENTS

| | | | | | |
|---|---|---|---|---|---|
| KR | 20160011597 | A | | 2/2016 | |
| KR | 20170030411 | A | | 3/2017 | |
| KR | 20170073217 | A | | 6/2017 | |
| KR | 20180070435 | A | | 6/2018 | |
| KR | 20190048923 | A | | 5/2019 | |
| KR | 20190059241 | A | | 5/2019 | |
| KR | 20190068474 | A | | 6/2019 | |
| KR | 20190069073 | A | * | 6/2019 | ............ H01M 4/131 |
| KR | 20190112030 | A | | 10/2019 | |
| KR | 20190117199 | A | | 10/2019 | |
| KR | 20190139033 | A | | 12/2019 | |
| WO | 2018117644 | A1 | | 6/2018 | |

* cited by examiner

POSITIVE ELECTRODE ACTIVE MATERIAL FOR LITHIUM SECONDARY BATTERY AND METHOD OF PREPARING THE SAME

CROSS-REFERENCE TO RELATED APPLICATIONS

This application is a national phase entry under 35 U.S.C. § 371 of International Application No. PCT/KR2021/001219, filed on Jan. 29, 2021, which claims priority from Korean Patent Application No. 10-2020-0011339, filed on Jan. 30, 2020, the disclosure of which is incorporated by reference herein.

TECHNICAL FIELD

The present invention relates to a positive electrode active material for a lithium secondary battery and a method of preparing the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium transition metal oxide, in which a portion of nickel (Ni) is substituted with cobalt (Co), manganese (Mn), or aluminum (Al), has been developed.

However, with respect to the lithium transition metal oxide, in a case in which an amount of nickel is increased in order to increase capacity characteristics, there has been a limitation in that the thermal stability is further reduced and a large amount of lithium by-product, such as LiOH or $Li_2CO_3$, is formed on a surface of the lithium transition metal oxide due to the tendency of the nickel in the lithium transition metal oxide to remain as $Ni^{2+}$. As described above, in a case in which the lithium transition metal oxide having a large amount of lithium by-product on the surface thereof is used as the positive electrode active material, since the lithium by-product reacts with an electrolyte solution injected into the lithium secondary battery to cause gas generation and a swelling phenomenon of the battery, battery lifetime, stability, and battery resistance characteristics may be degraded.

Conventionally, in order to compensate for this, a method of improving the above-described thermal stability, side reaction with the electrolyte solution, and resistance characteristics by minimizing interfaces of secondary particles by over-sintering the positive electrode active material was sought, but there was a problem in that degradation of performance, such as charge and discharge efficiency and resistance characteristics, became more severe when a degree of over-sintering was not controlled.

Thus, there is a need to develop a positive electrode active material which may suppress the side reaction with the electrolyte solution due to the minimization of the interfaces of the secondary particles and may improve the thermal stability and resistance characteristics without the performance degradation of the battery even if the over-sintering is performed according to surface modification of the positive electrode active material.

DISCLOSURE OF THE INVENTION

Technical Problem

An aspect of the present invention provides a positive electrode active material which may improve thermal stability and resistance characteristics and may suppress a side reaction with an electrolyte solution by improving surface characteristics of the positive electrode active material.

Another aspect of the present invention provides a method of preparing the positive electrode active material.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material including a lithium transition metal oxide having nickel (Ni) in an amount of greater than 50 mol % based on a total number of moles of transition metals in the lithium transition metal oxide, wherein the transition metals exclude lithium, wherein the positive electrode active material is in a form of single particles, wherein a single particle has a region of 50 nm or less from a surface of the single particle along a center direction, and wherein a structure belonging to space group FD3-M and a structure belonging to space group Fm3m are formed in the region, and a generation rate of fine powder having an average particle diameter ($D_{50}$) of 1 μm or less is in a range of 5% to 30% when the positive electrode active material is rolled at 650 kgf/cm$^2$.

According to another aspect of the present invention, there is provided a method of preparing a positive electrode active material which includes: mixing a transition metal hydroxide and a lithium (Li) raw material such that a molar ratio of Li in the Li raw material to transition metals in the transition metal hydroxide is in a range of 1.0 to 1.2, wherein the transition metal hydroxide has nickel (Ni) in an amount of greater than 50 mol % based on a total number of moles of transition metals, and over-sintering the mixture at 800° C. to 890° C. for 10 hours to 20 hours to prepare a positive electrode active material in the form of single particles, wherein a single particle has a region of 50 nm or less from a surface of the single particle along a center direction, and wherein a structure belonging to space group FD3-M and a structure belonging to space group Fm3m are formed in the region, and a generation rate of fine powder having an average particle diameter ($D_{50}$) of 1 μm or less is in a range of 5% to 30% when the positive electrode active material is rolled at 650 $kgf/cm^2$.

According to another aspect of the present invention, there is provided a positive electrode for a lithium secondary battery which includes the positive electrode active material.

According to another aspect of the present invention, there is provided a lithium secondary battery including the positive electrode.

Advantageous Effects

According to the present invention, a positive electrode active material in the form of a single particle may be prepared by performing over-sintering during preparation of the positive electrode active material. Accordingly, a side reaction with an electrolyte solution is suppressed when the positive electrode active material is used in a battery, and thermal stability and resistance characteristics may be further improved.

In addition, the present invention may prevent performance degradation of the battery due to the over-sintering by controlling a surface crystal structure of the positive electrode active material to have a specific structure and a ratio even if the over-sintering is performed.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the expression "primary particle" denotes a smallest particle unit which is distinguished as one body when a cross section of a positive electrode active material is observed through a scanning electron microscope (SEM), wherein it may be composed of a single grain, or may also be composed of a plurality of grains. In the present invention, an average particle diameter of the primary particle was measured by measuring a size of each particle distinguished from a cross-sectional SEM image of the positive electrode active material particles, and then calculating an arithmetic average value thereof.

In the present invention, the expression "secondary particle" denotes a secondary structure formed by aggregation of a plurality of primary particles. An average particle diameter of the secondary particle may be measured using a particle size analyzer, and, in the present invention, Microtrac S3500 was used as the particle size analyzer.

The expression "single particle" in the present specification is a term used to distinguish it from positive electrode active material particles in the form of a secondary particle formed by aggregation of tens to hundreds of primary particles which have been conventionally and generally used, wherein it is a concept including a single particle composed of one primary particle and an aggregate particle of 10 or less primary particles.

The expression "average particle diameter ($D_{50}$)" in the present specification may be defined as a particle diameter at a cumulative volume of 50% in a particle size distribution curve, and the average particle diameter ($D_{50}$) may be measured by using a laser diffraction method. Specifically, after target particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

Positive Electrode Active Material

A positive electrode active material according to the present invention includes a lithium transition metal oxide having nickel (Ni) in an amount of greater than 50 mol % based on a total number of moles of transition metals in the lithium transition metal oxide, wherein the transition metals exclude lithium, wherein the positive electrode active material is in a form of single particles, wherein a given single particle has a region of 50 nm or less from a surface of the particle along a center direction, and wherein a structure belonging to space group FD3-M and a structure belonging to space group Fm3m are formed in the region, and a generation rate of fine powder having an average particle diameter ($D_{50}$) of 1 μm or less is in a range of 5% to 30% when the positive electrode active material is rolled at 650 $kgf/cm^2$.

When described in more detail, first, the positive electrode active material according to the present invention may be a lithium transition metal oxide having Ni in an amount of greater than 50 mol % based on a total number of moles of transition metals in the lithium transition metal oxide, wherein the transition metals exclude lithium. In this case, when the amount of the nickel included in the lithium transition metal oxide is less than the above range, since capacity of the positive electrode active material is reduced, there is a limitation in that it may not be applicable to an electrochemical device requiring high capacity. As the amount of the nickel increases within the above range, a battery including the same may exhibit high capacity characteristics. However, an amount of cobalt and/or manganese is relatively reduced as the amount of the nickel increases, and, accordingly, charge and discharge efficiency may be reduced. Most preferably, the lithium transition metal oxide may be represented by Formula 1 below.

$$Li_{1+a}Ni_xCo_yMn_zM1_wO_2 \quad \text{[Formula 1]}$$

In Formula 1, 1+a represents a molar ratio of lithium in the lithium transition metal oxide represented by Formula 1, wherein a may satisfy $0 \le a \le 0.20$, for example, $0 \le a \le 0.15$.

x represents a molar ratio of nickel among metal components excluding lithium in the lithium transition metal oxide represented by Formula 1, wherein x may satisfy $0.5 < x < 1.0$, for example, $0.55 \le x \le 0.95$.

y represents a molar ratio of cobalt among the metal components excluding lithium in the lithium transition metal oxide represented by Formula 1, wherein y may satisfy $0 < y < 0.5$, for example, $0.025 \le y \le 0.35$.

z represents a molar ratio of manganese among the metal components excluding lithium in the lithium transition metal oxide represented by Formula 1, wherein z may satisfy $0<z<0.5$, for example, $0.025\leq z\leq 0.35$.

M1 is an element substituted for a transition metal site in the oxide represented by Formula 1, wherein M1 may include at least one selected from the group consisting of aluminum (Al), magnesium (Mg), vanadium (V), titanium (Ti), and zirconium (Zr).

w represents a molar ratio of doping element M1 among the metal components excluding lithium in the lithium transition metal oxide represented by Formula 1, wherein w may satisfy $0\leq w\leq 0.05$, for example, $0\leq w\leq 0.02$.

According to the present invention, the positive electrode active material has a single particle form. For example, an average particle diameter ($D_{50}$) of the positive electrode active material in the form of single particles may be in a range of 1 μm to 10 μm, for example, 2 μm to 7 μm.

Since the positive electrode active material is in the form of single particles, its particle strength may be excellent even if the positive electrode active material is formed to have a small particle diameter, an average particle diameter ($D_{50}$) of about 1 μm to about 10 μm. For example, the positive electrode active material may have a particle strength of 100 MPa to 300 MPa when rolled with a force of 650 kgf/cm$^2$.

Accordingly, even if the positive electrode active material is rolled with a strong force of 650 kgf/cm$^2$, a phenomenon of an increase in fine particles in an electrode due to breakage of the particles is mitigated, and, as a result, life characteristics of the battery are improved.

For example, when the positive electrode active material is rolled at 650 kgf/cm$^2$, a generation rate of fine powder having an average particle diameter ($D_{50}$) of 1 μm or less may be in a range of 5% to 30%, for example, 8% to 25%. Since the fine powder generation rate of the positive electrode active material is within the above-described range, discharge efficiency and initial resistance may be improved and high-temperature life characteristics may be optimized. In contrast, in a case in which the fine powder generation rate of the positive electrode active material is less than 5%, the initial resistance and low-temperature output may deteriorate, and, in contrast, in a case in which the fine powder generation rate is greater than 30%, processability of the electrode may be reduced to increase overall costs and high-temperature lifetime and storage characteristics may degrade.

According to the present invention, a structure belonging to space group FD3-M and a structure belonging to space group Fm3m may be formed in a region of 50 nm or less from a surface of the positive electrode active material in a center direction. In a case in which both the structure belonging to space group FD3-M and the structure belonging to space group Fm3m are formed in the region of 50 nm or less from the surface of the positive electrode active material in the center direction, surface reactivity may be improved and an effect of improving resistance and low-temperature output characteristics may simultaneously be achieved. For example, in a case in which at least one of the structure belonging to space group FD3-M or the structure belonging to space group Fm3m is formed in the region of greater than 50 nm from the surface of the positive electrode active material in the center direction, the discharge efficiency and resistance characteristics may degrade.

The positive electrode active material includes a center portion and a surface portion as the region of 50 nm or less from the surface of the positive electrode active material in the center direction, and, in this case, the center portion of the positive electrode active material according to the present invention may have a layered structure in which a space group belongs to R3-M. When the center portion of the positive electrode active material exhibits a layered structure in which the space group belongs to R3-M, and the surface portion has a crystal structure according to the present invention, optimal capacity and resistance characteristics may be obtained, and an effect of improving the high-temperature life characteristics may be further achieved.

According to the present invention, the structure belonging to space group FD3-M generally means a spinel structure.

The expression "spinel structure" means that a metal oxide layer composed of a transition metal and oxygen and an oxygen octahedral layer surrounding lithium have a three-dimensional arrangement. Thus, lithium ions move more smoothly and their speed is fast, and, as a result, intercalation and deintercalation of the lithium ions may be easier than that of the layered structure.

Also, the structure belonging to space group Fm3m generally means a rock-salt structure.

The expression "rock-salt structure" means a face-centered cubic structure in which a metal atom is coordinated by surrounding six oxygen atoms arranged in an octahedral form. A compound having the rock-salt structure has high structural stability. Accordingly, in a case in which a structure having high structural stability is formed on the surface of the positive electrode active material, an effect of suppressing a side reaction with an electrolyte solution may be further achieved.

For example, the positive electrode active material may have a formation ratio (FD3-M/Fm3m) of the structure belonging to space group FD3-M to the structure belonging to space group Fm3m of 0.2 to 0.7. When the ratio of FD3-M/Fm3m satisfies the above range, the surface reactivity may be improved and the resistance and low-temperature output characteristics may be simultaneously improved. In contrast, when the ratio of FD3-M/Fm3m is less than the above range, that is, less than 0.2, the discharge efficiency and resistance characteristics may degrade, and, when the ratio of FD3-M/Fm3m is greater than the above range and is greater than 0.7, side-reactivity with the electrolyte solution may be increased, and the high-temperature life characteristics and storage characteristics may degrade.

Also, the positive electrode active material may further include a coating layer formed on the surface thereof, and the coating layer may preferably include B (boron).

Since a contact between the positive electrode active material and the electrolyte solution included in the lithium secondary battery is blocked by the coating layer to suppress the occurrence of the side reaction, the life characteristics may be improved and, in addition, packing density of the positive electrode active material may be increased.

The coating layer may be formed across an entire surface of the positive electrode active material and may be partially formed. Specifically, in a case in which the coating layer is partially formed on the surface of the positive electrode active material, the coating layer may be formed in an area of 20% or more to less than 100% of a total area of the positive electrode active material. In a case in which the area of the coating layer is less than 20%, an effect of improving the life characteristics and improving the packing density according to the formation of the coating layer may be insignificant.

Method of Preparing Positive Electrode Active Material

Also, the present invention provides a method of preparing a positive electrode active material which includes:

mixing a transition metal hydroxide and a lithium (Li) raw material such that a molar ratio of Li in the Li raw material to transition metals in the transition metal hydroxide is in a range of 1 to 1.2, and over-sintering the mixture at 800° C. to 890° C. for 10 hours to 20 hours to prepare a positive electrode active material in the form of single particles, wherein a given single particle has a region of 50 nm or less from a surface of the particle along a center direction, and wherein a structure belonging to space group FD3-M and a structure belonging to space group Fm3m are formed in the region, and a generation rate of fine powder having an average particle diameter ($D_{50}$) of 1 μm or less is in a range of 5% to 30% when the positive electrode active material is rolled at 650 kgf/cm$^2$.

Hereinafter, the method of preparing a positive electrode active material of the present invention will be described in detail.

According to the present invention, a transition metal hydroxide, in which Ni is included in an amount of greater than 50 mol % based on a total number of moles of transition metals, is prepared, and the transition metal hydroxide and a lithium raw material are mixed such that a molar ratio of Li/transition metal is in a range of 1 to 1.2 and over-sintering is performed at 800° C. to 890° C. for 10 hours to 20 hours to prepare a positive electrode active material having a single particle form.

The transition metal hydroxide may be used by purchasing a commercially available positive electrode active material precursor, or may be prepared according to a method of preparing a positive electrode active material precursor which is well known in the art.

The lithium raw material may be lithium-containing carbonates (e.g., lithium carbonate, etc.), hydrates (e.g., lithium hydroxide I hydrate ($LiOH \cdot H_2O$), etc.), hydroxides (e.g., lithium hydroxide, etc.), nitrates (e.g., lithium nitrate ($LiNO_3$), etc.), or chlorides (e.g., lithium chloride (LiCl), etc.), but is not limited thereto.

During the preparation of the positive electrode active material, the transition metal hydroxide and the lithium raw material may be mixed such that the molar ratio of Li/transition metal is in a range of 1 to 1.2, preferably 1.05 to 1.15, and most preferably 1.1 to 1.15, and sintering may be performed. In this case, due to flux action of the lithium raw material, the structure belonging to space group FD3-M and the structure belonging to space group Fm3m may be formed in the region of 50 nm or less from the surface of the positive electrode active material in the center direction in the prepared positive electrode active material. In a case in which the molar ratio of Li/transition metal is less than 1, since a lithium equivalent ratio is insufficient, the discharge efficiency may be reduced and surface resistance may be significantly increased, and, in a case in which the molar ratio of Li/transition metal is greater than 1.2, since lithium ions may be substituted at transition metal sites of the layered structure of the positive electrode active material center portion, charge and discharge capacity may be rapidly reduced.

The positive electrode active material may be prepared in the form of single particles by performing over-sintering at 800° C. to 890° C. for 10 hours to 20 hours during the preparation of the positive electrode active material. In a case in which the over-sintering is performed at a high temperature of 800° C. to 890° C. for 10 hours to 20 hours as described above, the positive electrode active material is recrystallized to be formed into single particles with high structural stability in which a space group belongs to Fm3m. Accordingly, the positive electrode active material exhibits excellent particle strength due to the high structural stability, the particle is not broken even when compressed with a strong force of 650 kgf/cm$^2$, and its shape may be maintained. Thus, the phenomenon of the increase in fine particles in the electrode due to the breakage of the particles is suppressed, and, as a result, the life characteristics of the battery may be improved. For example, when the positive electrode active material prepared in the present invention is rolled at 650 kgf/cm$^2$, the generation rate of the fine powder having an average particle diameter ($D_5O$) of 1 μm or less may be in a range of 5% to 30%, for example, 8% to 25%.

For example, in a case in which the sintering is performed at less than the above-described temperature and time during the preparation of the positive electrode active material, sufficient kinetic energy required for the formation of the single particle may not be provided, or, in a case in which the sintering is performed in a range exceeding the above-described temperature and time, it is not easy to control a single particle size and a ratio of a surface phase or an amount of the fine powder generated.

Also, since the positive electrode active material is sintered at a high temperature of 800° C. or higher, an amount of lithium remaining on the surface of the positive electrode active material is reduced. Gas generation due to a reaction between the residual lithium and the electrolyte solution may be reduced due to such a residual lithium reduction effect.

In addition, the sintering may be performed in an oxygen or air atmosphere. In a case in which the sintering is performed in the above atmosphere, a local oxygen partial pressure increases so that crystallinity of the positive electrode active material is improved and control of the surface phase becomes easy. In contrast, in a case in which the sintering is performed in a non-oxidizing atmosphere or an inert gas atmosphere other than the above-described atmosphere, since the crystallinity is reduced and the surface phase is non-uniformly formed due to oxygen desorption during the sintering, the control of the phase present on the surface becomes difficult.

In a case in which the over-sintering is performed to form a single particle during the preparation of the positive electrode active material, the Fm3m structure may be excessively formed on the surface of the positive electrode active material, and, in this case, there may be a problem in that the discharge efficiency is reduced and the surface resistance is increased. In order to solve this problem in the present invention, the molar ratio of Li/transition metal (Me) during the mixing of the transition metal hydroxide and the lithium raw material, the sintering atmosphere, and the sintering temperature are controlled under specific conditions so that the structure belonging to space group FD3-M and the structure belonging to space group Fm3m may be formed together in the region of 50 nm or less from the surface of the positive electrode active material in the center direction, and thus, the side reaction between the positive electrode active material and the electrolyte solution may be suppressed by improving the surface reactivity, and the resistance and low-temperature output characteristics may be simultaneously improved.

Also, during the preparation of the lithium transition metal oxide, selectively doping the lithium transition metal oxide with a doping element M1 (where, M1 is at least one selected from the group consisting of aluminum (Al), magnesium (Mg), vanadium (V), titanium (Ti), and zirconium (Zr)), if necessary, in order to improve structural stability of the lithium transition metal oxide may be further included. For example, in a case in which the lithium transition metal oxide is doped with the doping element M1, the doping element M1 may be doped by introducing a doping element M1 raw material during a co-precipitation reaction for preparing a positive electrode active material precursor, or a M1-doped lithium transition metal oxide may be prepared by introducing the doping element M1 raw material during sintering of the positive electrode active material precursor and the lithium raw material.

Furthermore, the preparation method of the present invention may further include washing the positive electrode active material synthesized by the method as described above.

For example, a lithium by-product present as an impurity on the surface of the positive electrode active material may be effectively removed by mixing the positive electrode active material with a washing solution (preferably, distilled water) and washing the positive electrode active material.

In addition, the present invention may further include forming a coating layer, after the washing. Preferably, the coating layer may include B, but the present invention is not limited thereto.

For example, after a surface treatment is performed on the positive electrode active material with a composition for forming a coating layer, which is prepared by dispersing the coating element in a solvent, using a conventional slurry coating method such as application, immersion, and spraying, the coating layer may be formed on the surface of the positive electrode active material by performing a heat treatment.

A mixture of at least one selected from the group consisting of water, alcohol having 1 to 8 carbon atoms, dimethyl sulfoxide (DMSO), N-methylpyrrolidone, acetone, and a combination thereof may be used as the solvent capable of dispersing the coating element to form the coating layer. Also, the solvent may be included in an amount such that it may exhibit appropriate applicability and may be easily removed during the subsequent heat treatment.

Subsequently, the heat treatment for forming the coating layer may be performed in a temperature range in which the solvent contained in the composition may be removed, and may specifically be performed in a temperature range of 100° C. to 500° C., for example, 200° C. to 400° C. In a case in which the heat treatment temperature is less than 100° C., there is a concern that a side reaction may occur due to the residual solvent and, as a result, battery characteristics may degrade, and, in a case in which the heat treatment temperature is greater than 500° C., there is a concern that a side reaction due to high-temperature heat may occur.

Positive Electrode

Also, the present invention provides a positive electrode for a lithium secondary battery which includes the positive electrode active material prepared by the above-described method.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a positive electrode material mixture, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the positive electrode material mixture and manufacturing yield, and may allow to have a viscosity that may provide excellent thickness uniformity during the subsequent coating for the preparation of the positive electrode.

Also, as another method, the positive electrode may be prepared by casting the positive electrode material mixture on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic substance alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic substance and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 part by weight to 10 parts by weight based on 100 parts by weight of the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber, a nitrile-butadiene rubber, a fluorine rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLE 1

$Ni_{0.88}Co_{0.06}Mn_{0.06}(OH)_2$ and LiOH were mixed such that a molar ratio of Li/Me was 1.1, and sintering was performed at 850° C. for 15 hours in an oxygen atmosphere to obtain a lithium transition metal oxide. The above-obtained lithium transition metal oxide was washed using distilled water and dried, $H_3BO_3$ was mixed with the washed and dried lithium transition metal oxide such that an amount of B in a finally-prepared positive electrode active material was 500 ppm, and a heat treatment was performed at 300° C. to prepare the positive electrode active material having a coating layer formed on a surface thereof.

EXAMPLE 2

A positive electrode active material was prepared in the same manner as in Example 1 except that mixing was performed such that the molar ratio of Li/Me was 1.15.

EXAMPLE 3

A positive electrode active material was prepared in the same manner as in Example 1 except that mixing was performed such that the molar ratio of Li/Me was 1.15 and sintering was performed in an air atmosphere.

COMPARATIVE EXAMPLE 1

A positive electrode active material was prepared in the same manner as in Example 1 except that mixing was performed such that the molar ratio of Li/Me was 1.15 and sintering was performed at 950° C. for 25 hours in an air atmosphere.

COMPARATIVE EXAMPLE 2

A positive electrode active material was prepared in the same manner as in Example 1 except that sintering was performed at 900° C. in an air atmosphere.

COMPARATIVE EXAMPLE 3

A positive electrode active material was prepared in the same manner as in Example 1 except that mixing was performed such that the molar ratio of Li/Me was 1.15 and sintering was performed at 780° C. for 10 hours.

COMPARATIVE EXAMPLE 4

A positive electrode active material was prepared in the same manner as in Example 1 except that mixing was performed such that the molar ratio of Li/Me was 1.15 and sintering was performed at 950° C. in an air atmosphere.

COMPARATIVE EXAMPLE 5

A positive electrode active material was prepared in the same manner as in Example 1 except that mixing was performed such that the molar ratio of Li/Me was 1.3.

COMPARATIVE EXAMPLE 6

A positive electrode active material was prepared in the same manner as in Example 1 except that sintering was performed in a nitrogen atmosphere.

EXPERIMENTAL EXAMPLE 1

Analysis of Characteristics of Positive Electrode Active Material (1) Average Particle Diameter In order to measure average particle diameters of positive electrode active material particles in the form of a single particle which were prepared in Examples 1 to 3 and Comparative Examples 1 to 6, particle sizes of the positive electrode active materials formed in Examples 1 to 3 and Comparative Examples 1 to 6 were measured using S-3500 by Microtrac, and the results thereof are presented in Table 1 below.

(2) Particle Strength

Samples of the positive electrode active material particles prepared in Examples 1 to 3 and Comparative Examples 1 to 6 were collected, a pressure of 650 $kgf/cm^2$ was applied to each collected sample, time of occurrence of cracks in the particles was measured and converted into a pressure unit (MPa), and the results thereof are presented in Table 1 below.

TABLE 1

| | Average particle diameter, $D_{50}$ (μm) | Particle strength (MPa) |
|---|---|---|
| Example 1 | 4.4 | 210 |
| Example 2 | 4.9 | 205 |
| Example 3 | 4.5 | 191 |
| Comparative Example 1 | 7.7 | 270 |
| Comparative Example 2 | 5.8 | 224 |
| Comparative Example 3 | 4.3 | 134 |
| Comparative Example 4 | 7.5 | 245 |
| Comparative Example 5 | 4.5 | 130 |
| Comparative Example 6 | 8.5 | 340 |

As illustrated in Table 1, with respect to the positive electrode active materials prepared in Examples 1 to 3, it may be confirmed that particle strengths were improved in comparison to those of Comparative Examples 3 and 5 having similar average particle diameters, even if the positive electrode active materials prepared in Examples 1 to 3 had small particle diameters in which average particle diameters were about 4 μm to about 5 μm. With respect to Comparative Examples 1, 2, 4, and 6, it may be understood that particle strengths were also high because average particle diameters were relatively larger than those of Examples 1 to 3.

EXPERIMENTAL EXAMPLE 2

Analysis of Surface Phases of Positive Electrode Active Material

Cross sections of the positive electrode active materials prepared by the examples and the comparative examples were cut, a region of 50 nm or less from a surface of each positive electrode active material in a center direction was observed using a transmission electron microscope (TEM) (FE-STEM, TITAN G2 80-100 ChemiSTEM), and, with respect to phases of the positive electrode active materials, the presence of a FD3-M phase and the presence of a Fm3m phase were confirmed by a small angle diffraction pattern (SADP).

In addition, lengths of a structure belonging to space group FD3-M and a structure belonging to space group Fm3m, which were present on the surface in this case, were respectively measured, and a formation ratio of FD3-M/Fm3m, which were present on the surface in this case, was confirmed and presented in Table 2 below.

TABLE 2

| | The presence of FD3-M phase | The presence of Fm3m phase | Formation ratio FD3-M/Fm3m |
|---|---|---|---|
| Example 1 | ○ | ○ | 0.4 |
| Example 2 | ○ | ○ | 0.3 |
| Example 3 | ○ | ○ | 0.7 |
| Comparative Example 1 | x | ○ | — |
| Comparative Example 2 | x | ○ | — |
| Comparative Example 3 | x | x | — |
| Comparative Example 4 | x | ○ | — |
| Comparative Example 5 | ○ | x | — |
| Comparative Example 6 | x | ○ | — |

As illustrated in Table 2, with respect to the positive electrode active materials prepared in Examples 1 to 3, it may be confirmed that the structure belonging to space group FD3-M and the structure belonging to space group Fm3m were formed together in a specific ratio in the region of 50 nm or less from the surface of the positive electrode active material in the center direction. In contrast, with respect to the positive electrode active materials prepared in Comparative Examples 1 to 6, only the structure belonging to space group FD3-M or the structure belonging to space group Fm3m was observed in the region of 50 nm or less from the surface of the positive electrode active material in the center direction. The reason for this is that, with respect to the positive electrode active materials prepared in Comparative Examples 1 to 6, the structure belonging to space group FD3-M or the structure belonging to space group Fm3m was formed as over-sintering was performed during the preparation of the positive electrode active materials, but, since the sintering temperature, sintering time, and sintering atmosphere in this case were not all performed under optimized conditions, it may be confirmed that the structure belonging to space group FD3-M and the structure belonging to space group Fm3m were not formed together.

EXPERIMENTAL EXAMPLE 3

Evaluation of Amount of Fine Powder Generated

After the positive electrode active materials prepared in Examples 1 to 3 and Comparative Examples 1 to 6 were respectively rolled at 650 kgf/cm$^2$, a particle size distribution was measured to measure a generation rate of fine powder having a particle diameter of less than 1 μm. The particle size distribution was measured using S-3500 by Microtrac, the generation rate of the fine powder having a particle diameter of less than 1 μm was converted into wt % with respect to a total weight of the positive electrode active material, and measurement results are presented in Table 3 below.

TABLE 3

| | Fine powder generation rate (%) |
|---|---|
| Example 1 | 16 |
| Example 2 | 9 |
| Example 3 | 22 |
| Comparative Example 1 | 5 |
| Comparative Example 2 | 1 |
| Comparative Example 3 | 40 |
| Comparative Example 4 | 4 |
| Comparative Example 5 | 35 |
| Comparative Example 6 | 2 |

As illustrated in Table 3, in a case in which the positive electrode active materials prepared in Examples 1 to were rolled, it may be confirmed that fine powder generation rates were within the optimum range according to the present application. In contrast, it may be confirmed that fine powder generation rates during the rolling of the positive electrode active materials prepared in Comparative Examples 2 to 6 were outside the optimum range of the present application.

EXPERIMENTAL EXAMPLE 4

Determination of Electrochemical Characteristics

Lithium secondary batteries were prepared by using the positive electrode active materials prepared in Examples to 3 and Comparative Examples 1 to 6, and capacity was evaluated for each of the lithium secondary batteries including the positive electrode active materials of Examples 1 to 3 and Comparative Examples 1 to 6.

Specifically, each of the positive electrode active materials prepared in Examples 1 to 3 and Comparative Examples 1 to 6, a conductive agent, and a binder were mixed in a solvent at a weight ratio of 96:2:2 to prepare a positive electrode slurry. One surface of an aluminum current collector was coated with the positive electrode slurry, dried at 130° C., and then rolled to prepare a positive electrode.

Lithium metal was used as a negative electrode.

Each of the lithium secondary batteries according to Examples 1 to 3 and Comparative Examples 1 to 6 was prepared by preparing an electrode assembly by disposing a separator between the positive electrode and negative electrode prepared as described above, disposing the electrode assembly in a battery case, and then injecting an electrolyte solution into the case.

Subsequently, each of the lithium secondary batteries prepared in Examples 1 to 3 and Comparative Examples 1 to 6 was charged at a constant current of 0.2 C to 4.25 V at 25° C. Thereafter, charge capacity was obtained under a termination condition of a constant voltage of 0.05 C. Subsequently, discharge was performed at a constant current of 0.2 C to 3.0 V to observe initial charge, discharge capacity, and charge and discharge efficiency in the first cycle, and these are presented in Table 4 below.

TABLE 4

| | Charge capacity (mAh/g) | Discharge capacity (mAh/g) | Efficiency (%) |
|---|---|---|---|
| Example 1 | 234.1 | 206.3 | 88.1 |
| Example 2 | 233.7 | 204.5 | 87.5 |
| Example 3 | 233.9 | 207.5 | 88.7 |
| Comparative Example 1 | 233.4 | 197.2 | 84.5 |
| Comparative Example 2 | 234 | 201 | 85.9 |
| Comparative Example 3 | 235.2 | 212 | 90.1 |
| Comparative Example 4 | 234.8 | 199.7 | 85.1 |
| Comparative Example 5 | 218.0 | 197.0 | 90.4 |
| Comparative Example 6 | 230.5 | 189.0 | 82.0 |

As illustrated in Table 4, it may be confirmed that initial charges, discharge capacities, and charge and discharge efficiencies of the secondary batteries of Examples 1 to 3 were better than those of the secondary batteries of Comparative Examples 1, 2, and 4 to 6 in which the structure belonging to space group FD3-M and the structure belonging to space group Fm3m were not formed together.

EXPERIMENTAL EXAMPLE 5

Resistance Characteristics

Low-temperature (−10° C.) output characteristics of lithium secondary batteries including the positive electrode active materials of Examples 1 to 3 and Comparative Examples to 6, which were prepared in the same manner as in Experimental Example 4, were respectively confirmed. Specifically, the lithium secondary batteries prepared in Examples 1 to 3 and Comparative Examples 1 to 6 were charged at a constant current of 0.4 C to a state of charge (SOC) of 35 at a low temperature (−10° C.), and then discharged at a constant current of 0.4 C for 1,350 seconds to measure a voltage drop for 1,350 seconds, and resistance at a low temperature was measured by dividing the voltage drop by a current value and presented in Table 5 below.

TABLE 5

| | Resistance (Ω) | Resistance percentage (%), relative to Example 1 |
|---|---|---|
| Example 1 | 37 | 100 (ref.) |
| Example 2 | 39 | 105 |
| Example 3 | 35 | 95 |
| Comparative Example 1 | 57 | 154 |
| Comparative Example 2 | 49 | 132 |
| Comparative Example 3 | 38 | 103 |
| Comparative Example 4 | 51 | 138 |
| Comparative Example 5 | 37.5 | 101.4 |
| Comparative Example 6 | 78 | 210.8 |

As illustrated in Table 5, it may be confirmed that low-temperature resistances of the secondary batteries of Examples 1 to 3 were improved in comparison to those of the secondary batteries of Comparative Examples 1 to 6 in which the structure belonging to space group FD3-M and the structure belonging to space group Fm3m were not formed together.

EXPERIMENTAL EXAMPLE 6

Continuous Charge Characteristics

After lithium secondary batteries including the positive electrode active materials of Examples 1 to 3 and Comparative Examples 1 to 6, which were prepared in the same manner as in Experimental Example 4, were respectively charged at a constant current of 0.2 C to 4.7 V at 50° C., constant-voltage charge was continuously performed for 120 hours. An amount of current generated for 0 to 120 hours was measured, and the results thereof are presented in Table 6 below.

In this case, an average leakage current value calculated in Table 6 was calculated by integrating the current value obtained during continuous charge and then dividing it by 120 hours, leakage current measurement time.

TABLE 6

| | Average leakage current (mAh/h) |
|---|---|
| Example 1 | 0.05 |
| Example 2 | 0.08 |
| Example 3 | 0.03 |
| Comparative Example 1 | 0 |
| Comparative Example 2 | 0.12 |
| Comparative Example 3 | 0.38 |
| Comparative Example 4 | 0 |
| Comparative Example 5 | 0.32 |
| Comparative Example 6 | 0 |

As illustrated in Table 6, with respect to the secondary batteries of Examples 1 to 3, it may be confirmed that current values generated to maintain a voltage of 4.7 V at a high temperature of 50° C. were lower than those of the secondary batteries of Comparative Examples 2, 3, and 5. With respect to the above-described average leakage current values, since more current is required to maintain a voltage of 4.7 V as more side reactions occur at an interface between the positive electrode active material and the electrolyte solution, it may be confirmed that the larger the leakage current value is, the lower the surface stability of the positive electrode active material is, and the smaller the leakage current value is, the higher the surface stability of the positive electrode active material is.

The invention claimed is:

1. A positive electrode active material, comprising:

a lithium transition metal oxide having nickel (Ni) in an amount of greater than 50 mol % based on a total number of moles of transition metals in the lithium transition metal oxide, wherein the transition metals exclude lithium, wherein the positive electrode active material is in a form of single particles, wherein a single particle has a region of 50 nm or less from a surface of the single particle along a center direction, and wherein a structure belonging to space group FD3-M and a structure belonging to space group Fm3m are formed in the region, wherein a generation rate of fine powder having an average particle diameter ($D_{50}$) of 1 μm or less is in a range of 5% to 30% when the positive electrode active material is rolled at 650 kgf/cm$^2$, wherein the positive electrode active material has a formation ratio of 0.2 to 0.7, where the formation ratio is the length of the structure belonging to space group FD3-M in the region to the length of the structure belonging to space group Fm3m in the region, where each length is measured along the center direction, and wherein the lithium transition metal oxide is represented by Formula 1:

$$Li_{1+a}Ni_xCo_yMn_zM1_wO_2 \quad \text{[Formula 1]}$$

wherein, in Formula 1,

M1 is at least one selected from the group consisting of aluminum (Al), magnesium (Mg), vanadium (V), titanium (Ti), and zirconium (Zr), and $0 \le a \le 0.20$, $0.5 < x < 1.0$, $0 < y < 0.5$, $0 < z < 0.5$, $0 \le w \le 0.05$, and $x+y+z+w=1$.

2. The positive electrode active material of claim 1, wherein the structure belonging to space group FD3-M is a spinel structure.

3. The positive electrode active material of claim 1, wherein the structure belonging to space group Fm3m is a rock-salt structure.

4. The positive electrode active material of claim 1, wherein the single particles have an average particle diameter ($D_{50}$) of 1 μm to 10 μm.

5. The positive electrode active material of claim 1, wherein the generation rate is in a range of 8% to 25%.

6. A positive electrode for a lithium secondary battery, the positive electrode comprising the positive electrode active material of claim 1.

7. A lithium secondary battery comprising the positive electrode of claim 6.

8. A positive electrode active material, comprising:

a lithium transition metal oxide having nickel (Ni) in an amount of greater than 50 mol % based on a total number of moles of transition metals in the lithium transition metal oxide, wherein the transition metals exclude lithium, wherein the positive electrode active material is in a form of single particles, wherein a single particle has a region of 50 nm or less from a surface of the single particle along a center direction, and wherein a structure belonging to space group FD3-M and a structure belonging to space group Fm3m are formed in the region, wherein the positive electrode active material has a formation ratio of 0.2 to 0.7, where the formation ratio is the length of the structure belonging to space group FD3-M in the region to the length of the structure belonging to space group Fm3m in the region, where each length is measured along the center direction, and wherein the lithium transition metal oxide is represented by Formula 1:

$Li_{1+a}Ni_xCo_yMn_zM1_wO_2$ [Formula 1]

wherein, in Formula 1,

M1 is at least one selected from the group consisting of aluminum (Al), magnesium (Mg), vanadium (V), titanium (Ti), and zirconium (Zr), and $0 \leq a \leq 0.20$, $0.5 < x < 1.0$, $0 < y < 0.5$, $0 < z < 0.5$, $0 \leq w \leq 0.05$, and $x+y+z+w=1$.

9. A method of preparing a positive electrode active material, the method comprising:

mixing a transition metal hydroxide and a lithium (Li) raw material such that a molar ratio of Li in the Li raw material to transition metals in the transition metal hydroxide is in a range of 1 to 1.2, wherein the transition metal hydroxide has nickel (Ni) in an amount of greater than 50 mol % based on a total number of moles of transition metals; and over-sintering the mixture at 800° C. to 890° C. for 10 hours to 20 hours to prepare a positive electrode active material in the form of single particles, wherein a single particle has a region of 50 nm or less from a surface of the single particle along a center direction, and wherein a structure belonging to space group FD3-M and a structure belonging to space group Fm3m are formed in the region, wherein the positive electrode active material has a generation rate of fine powder having an average particle diameter ($D_{50}$) of 1 μm or less in a range of 5% to 30% when the positive electrode active material is rolled at 650 kgf/cm$^2$, and wherein the positive electrode active material has a formation ratio of 0.2 to 0.7, where the formation ratio is the length of the structure belonging to space group FD3-M in the region to the length of the structure belonging to space group Fm3m in the region, where each length is measured along the center direction.

10. The method of claim 9, wherein the mixing is performed such that the molar ratio is in a range of 1.05 to 1.15.

11. The method of claim 9, wherein the over-sintering is performed in an oxygen or air atmosphere.

* * * * *